United States Patent
Kovacs

(10) Patent No.: US 11,670,028 B1
(45) Date of Patent: Jun. 6, 2023

(54) INFLUENCING ACTIONS OF AGENTS

(71) Applicant: Apple Inc., Cupertino, CA (US)

(72) Inventor: Daniel Laszlo Kovacs, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 266 days.

(21) Appl. No.: 16/998,263

(22) Filed: Aug. 20, 2020

Related U.S. Application Data

(60) Provisional application No. 62/906,655, filed on Sep. 26, 2019.

(51) Int. Cl.

| | |
|---|---|
| *G06T 13/40* | (2011.01) |
| *G06N 20/00* | (2019.01) |
| *G06T 19/00* | (2011.01) |
| *G06T 19/20* | (2011.01) |
| *G06N 3/006* | (2023.01) |

(52) U.S. Cl.
CPC ............ *G06T 13/40* (2013.01); *G06N 3/006* (2013.01); *G06N 20/00* (2019.01); *G06T 19/006* (2013.01); *G06T 19/20* (2013.01)

(58) Field of Classification Search
None
See application file for complete search history.

(56) References Cited

U.S. PATENT DOCUMENTS

| | | | | |
|---|---|---|---|---|
| 2020/0218992 | A1* | 7/2020 | Capobianco | G06N 3/04 |
| 2020/0302323 | A1* | 9/2020 | Macglashan | G06N 3/006 |
| 2020/0356897 | A1* | 11/2020 | Diggle | G06N 3/006 |
| 2022/0229990 | A1* | 7/2022 | Turkkan | G06N 5/025 |
| 2022/0284649 | A1* | 9/2022 | Bach | G06T 13/205 |

* cited by examiner

*Primary Examiner* — Michael J Cobb
(74) *Attorney, Agent, or Firm* — Fernando & Partners, LLP

(57) ABSTRACT

A method includes obtaining, by a first agent engine that generates actions for a first agent, a first objective of the first agent. In some implementations, the method includes generating, by the first agent engine, a first influence for a second agent engine that generates actions for a computer-generated reality (CGR) representation of a second agent. In some implementations, the first influence is based on the first objective of the first agent. In some implementations, the method includes triggering the CGR representation of the second agent to perform a set of one or more actions that advances the first objective of the first agent. In some implementations, the second agent engine generates the set of one or more actions based on the first influence generated by the first agent engine.

25 Claims, 12 Drawing Sheets

| Second agent is an environmental agent and the first influence triggers changes in environmental settings | —430a |

| Second agent is a character agent | —430b |

| Second agent is an equipment agent | —430c |

| Display manipulations of the CGR representation of the second agent in accordance with the first influence | —430d |

- Obtain a proposed modification to the first influence
- Modify the first influence based on the proposed modification in order to generate a second influence
- Provide the second influence to the second agent engine

—440

- Obtain, by the second agent engine, a second objective for the second agent
- Generate a second influence for the first agent engine
- Trigger the CGR representation of the first agent to perform actions that advance the second objective

INFLUENCING ACTIONS OF AGENTS

CROSS-REFERENCE TO RELATED APPLICATION

This application claims the benefit of U.S. Provisional Patent App. No. 62/906,655, filed on Sep. 26, 2019, which is incorporated by reference in its entirety.

TECHNICAL FIELD

The present disclosure generally relates to influencing actions of agents.

BACKGROUND

Some devices are capable of generating and presenting computer-generated reality (CGR) environments. Some CGR environments include virtual environments that are simulated replacements of physical environments. Some CGR environments include augmented environments that are modified versions of physical environments. Some devices that present CGR environments include mobile communication devices such as smartphones, head-mountable displays (HMDs), eyeglasses, heads-up displays (HUDs), and optical projection systems. Most previously available devices that present CGR environments are ineffective at presenting representations of certain objects. For example, some previously available devices that present CGR environments are unsuitable for presenting representations of objects that are associated with an action.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A-4B are flowchart representations of a method of influencing actions of agents in accordance with some implementations.

Figure 1:
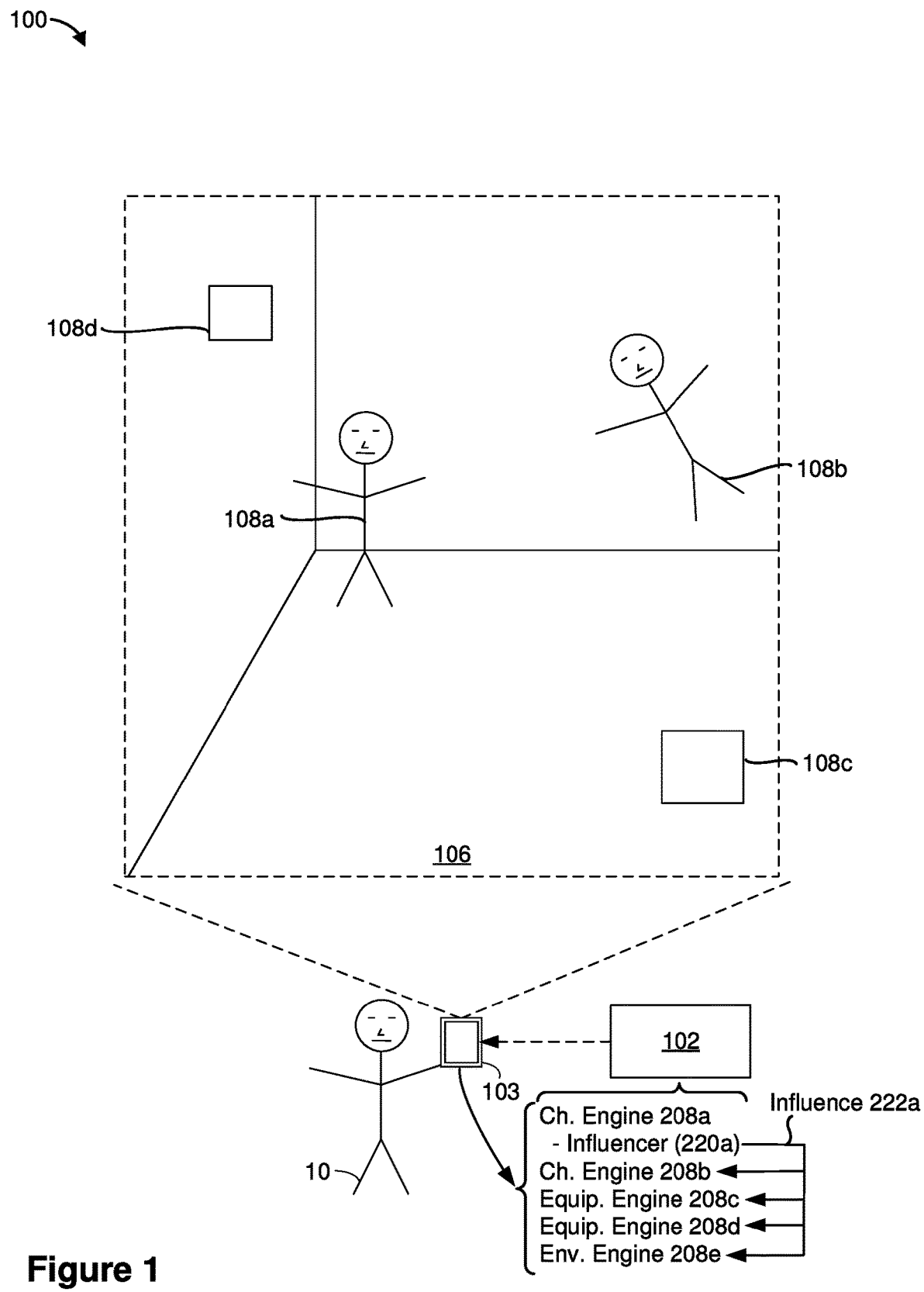
FIG. 1 is a diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for influencing actions of agents. In various implementations, a device includes a non-transitory memory and one or more processors coupled with the non-transitory memory. In some implementations, a method includes obtaining, by a first agent engine that generates actions for a first agent, a first objective of the first agent. In some implementations, the method includes generating, by the first agent engine, a first influence for a second agent engine that generates actions for a computer-generated reality (CGR) representation of a second agent. In some implementations, the first influence is based on the first objective of the first agent. In some implementations, the method includes triggering the CGR representation of the second agent to perform a set of one or more actions that advances the first objective of the first agent. In some implementations, the second agent engine generates the set of one or more actions based on the first influence generated by the first agent engine.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a device directs a CGR representation of an agent to perform one or more actions in order to effectuate (e.g., advance, satisfy, complete and/or achieve) one or more objectives (e.g., results and/or goals). In some implementations, the agent is associated with a particular objective, and the CGR representation of the agent performs actions that improve the likelihood of effectuating that particular objective. In some implementations, the CGR representation of the agent corresponds to a CGR affordance. In some implementations, the CGR representation of the agent is referred to as a CGR object, a virtual object or a graphical object. In some implementations, an agent is referred to as a virtual intelligent agent (VIA) or an intelligent agent.

In some implementations, a CGR representation of the agent performs a sequence of actions. In some implementations, a device determines (e.g., generates and/or synthesizes) the actions for the agent. In some implementations, the actions generated for the agent are within a degree of similarity to (e.g., within a similarity threshold of) actions that a corresponding entity (e.g., a character, an equipment and/or a thing) performs as described in fictional material or as exists in a physical environment. For example, in some implementations, a CGR representation of an agent that models the behavior of a fictional action figure performs the action of flying in a CGR environment because the corresponding fictional action figure flies as described in the fictional material. Similarly, in some implementations, a CGR representation of an agent that models the behavior of a physical drone performs the action of hovering in a CGR environment because the corresponding physical drone hovers in a physical environment. In some implementations, the device obtains the actions for the agent. For example, in some implementations, the device receives the actions for the agent from a separate device (e.g., a remote server) that determines the actions.

In some implementations, an agent that models the behavior of a character is referred to as a character agent, an objective of the character agent is referred to as a character objective, and a CGR representation of the character agent is referred to as a CGR character or a virtual character. In some implementations, the CGR character performs actions in order to effectuate the character objective.

In some implementations, an agent that models the behavior of an equipment (e.g., a rope for climbing, an airplane for flying, a pair of scissors for cutting) is referred to as an equipment agent, an objective of the equipment agent is referred to as an equipment objective, and a CGR representation of the equipment agent is referred to as a CGR equipment or a virtual equipment. In some implementations, the CGR equipment performs actions in order to effectuate the equipment objective.

In some implementations, an agent that models the behavior of an environment (e.g., weather pattern, features of nature and/or gravity level) is referred to as an environmental agent, and an objective of the environmental agent is referred to as an environmental objective. In some implementations, the environmental agent configures an environment of the CGR environment in order to effectuate the environmental objective.

An emergent content engine generates objectives for different agents. However, the objectives of different agents may not be coordinated towards a mutual plan. A director can generate directives that provide guidance to agents on how to accomplish their objectives. However, this does not allow agents to influence content generation because agents may only follow directives generated by the director.

The present disclosure provides methods, systems, and/or devices that allow a first agent to influence actions of a second agent in order to advance an objective of the first agent. In some implementations, the first agent operates as a master agent and the second agent operates as a slave agent that performs actions to advance the objective of the master agent. In some implementations, the first agent generates influences for the second agent. As such, in some implementations, the first agent is referred to as an influencer agent and the second agent is referred to as an influencee agent. In some implementations, the influences provide guidance to the second agent on how to advance the objective of the first agent.

In some implementations, the influence generated by the first agent modifies an existing objective of the second agent in order to advance the objective of the first agent. For example, in some implementations, the influence instructs the second agent to prioritize the objective of the first agent over an objective of the second agent. In some implementations, the influence delays actions that advance the objective of the second agent until the objective of the first agent is satisfied. In some implementations, the influence bounds the objective of the second agent in order to accelerate the advancement of the objective of the first agent.

In some implementations, the influence generated by the first agent modifies an existing directive of the second agent in order to advance the objective of the first agent. In some implementations, the influence further defines an existing directive of the second agent. For example, if the existing directive includes vague guidance, the influence provides specific guidance. In a non-limiting example, if an existing directive includes guidance on actions that the second agent has to perform, the influence provides guidance on how to perform the actions (e.g., while exhibiting a particular behavior, for example, perform the actions angrily), a time for performing the actions and/or a location within the CGR environment for performing the actions. In some implementations, the influence overwrites an existing directive of the second agent.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 102 and an electronic device 103. In the example of FIG. 1, the electronic device 103 is being held by a user 10. In some implementations, the electronic device 103 includes a smartphone, a tablet, a laptop, or the like.

As illustrated in FIG. 1, the electronic device 103 presents a computer-generated reality (CGR) environment 106. In some implementations, the CGR environment 106 is generated by the controller 102 and/or the electronic device 103. In some implementations, the CGR environment 106 includes a virtual environment that is a simulated replacement of a physical environment. In other words, in some implementations, the CGR environment 106 is synthesized by the controller 102 and/or the electronic device 103. In such implementations, the CGR environment 106 is different from a physical environment where the electronic device 103 is located. In some implementations, the CGR environment 106 includes an augmented environment that is a modified version of a physical environment. For example, in some implementations, the controller 102 and/or the electronic device 103 modify (e.g., augment) the physical environment where the electronic device 103 is located in order to generate the CGR environment 106. In some implementations, the controller 102 and/or the electronic device 103 generate the CGR environment 106 by simulating a replica of the physical environment where the electronic device 103 is located. In some implementations, the controller 102 and/or the electronic device 103 generate the CGR environment 106 by removing and/or adding items from the simulated replica of the physical environment where the electronic device 103 is located.

In some implementations, the CGR environment 106 includes various CGR representations of agents, such as a boy action figure representation 108a, a girl action figure representation 108b, a robot representation 108c, and a drone representation 108d. In some implementations, the agents represent and model the behavior of characters from fictional materials, such as movies, video games, comics, and novels. For example, the boy action figure representation 108a represents and models the behavior of a 'boy action figure' character from a fictional comic, and the girl action figure representation 108b represents a 'girl action figure' character from a fictional video game. In some implementations, the CGR environment 106 includes agents that represent and model the behavior of characters from different fictional materials (e.g., from different movies, games, comics or novels). In various implementations, the agents represent and model the behavior of physical entities (e.g., tangible objects). For example, in some implementations, the agents represent and model the behavior of equipment (e.g., machinery such as planes, tanks, robots, motorcycles, etc.). In the example of FIG. 1, the robot representation 108c represents and models the behavior of a robot and the drone representation 108d represents and models the behavior of a drone. In some implementations, the agents represent and model the behavior of entities (e.g., characters or equipment) from fictional materials. In some implementations, the agents represent entities from a physical environment, including entities located inside and/or outside of the CGR environment 106.

In various implementations, a CGR representation of an agent performs one or more actions in order to effectuate (e.g., advance, complete, satisfy or achieve) one or more objectives of the agent. In some implementations, the CGR representation of the agent perform a sequence of actions. In some implementations, the controller 102 and/or the electronic device 103 determine the actions that the CGR representation of an agent performs. In some implementations, the actions of a CGR representation of an agent are within a degree of similarity to (e.g., within a similarity threshold of) actions that the corresponding entity (e.g., character, equipment or thing) performs in the fictional material. In the example of FIG. 1, the girl action figure representation 108b is performing the action of flying (e.g., because the corresponding 'girl action figure' character is capable of flying, and/or the 'girl action figure' character frequently flies in the fictional materials). In the example of FIG. 1, the drone representation 108d is performing the action of hovering (e.g., because drones in physical environments are capable of hovering). In some implementations, the controller 102 and/or the electronic device 103 obtain the actions for the agents. For example, in some implementations, the controller 102 and/or the electronic device 103 receive the actions for the agents from a remote server that determines (e.g., selects) the actions. In some implementations, a CGR representation of an agent is referred to as a CGR object, a virtual object or a graphical object.

In some implementations, the CGR environment 106 is generated based on a user input from the user 10. For example, in some implementations, the electronic device 103 receives a user input indicating a terrain for the CGR environment 106. In such implementations, the controller 102 and/or the electronic device 103 configure the CGR environment 106 such that the CGR environment 106 includes the terrain indicated via the user input. In some implementations, the user input indicates environmental conditions for the CGR environment 106. In such implementations, the controller 102 and/or the electronic device 103 configure the CGR environment 106 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow). In some implementations, the user input specifies a time period for the CGR environment 106. In such implementations, the controller 102 and/or the electronic device 103 maintain and present the CGR environment 106 during the specified time period.

In some implementations, the controller 102 and/or the electronic device 103 determine (e.g., generate) actions for the agents based on a user input from the user 10. For example, in some implementations, the electronic device 103 receives a user input indicating placement of the CGR representations of the agents. In such implementations, the controller 102 and/or the electronic device 103 position the CGR representations of the agents in accordance with the placement indicated by the user input. In some implementations, the user input indicates specific actions that the agents are permitted to perform. In such implementations, the controller 102 and/or the electronic device 103 select the actions for the agents from the specific actions indicated by the user input. In some implementations, the controller 102 and/or the electronic device 103 forgo actions that are not among the specific actions indicated by the user input.

In some implementations, the controller 102 and/or the electronic device 103 include one or more agent engines that generate actions or responses for corresponding agents. In the example of FIG. 1, the controller 102 and/or the electronic device 103 include a boy character engine 208a that generates actions for the boy action figure representation 108a, a girl character engine 208b that generates actions for the girl action figure representation 108b, a robot equipment engine 208c that generates actions for the robot representation 108c, a drone equipment engine 208d that generates actions for the drone representation 108d, and an environmental engine 208e that generates environmental responses for the CGR environment 106.

In the example of FIG. 1, the boy character engine 208a includes an influencer 220a that generates influences 222a for the girl character engine 208b, the robot equipment engine 208c, the drone equipment engine 208d and/or the environmental engine 208e. The influences 222a trigger the girl character engine 208b, the robot equipment engine 208c, the drone equipment engine 208d and/or the environmental engine 208e to generate actions that advance an objective of the boy agent. For example, in some implementations, the influences 222a trigger the girl character engine 208b to generate an action that the girl action figure representation 108b performs in order to advance an objective of the boy action figure representation 108a. Similarly, in some implementations, the influences 222a trigger the robot equipment engine 208b to generate actions that the robot representation 108c performs in order to advance an objective of the boy action figure representation 108a. In some implementations, the influences 222a trigger the environmental engine 208e to generate environmental responses that advance an objective of the boy action figure representation 108a.

In some implementations, the user 10 wears a head-mountable device (HMD). In various implementations, the HMD operates in substantially the same manner as the electronic device 103 shown in FIG. 1. In some implementations, the HMD performs substantially the same operations as the electronic device 103 shown in FIG. 1. In some implementations, the HMD includes a head-mountable enclosure. In some implementations, the head-mountable enclosure is shaped to form a receptacle for receiving an electronic device with a display (e.g., the electronic device 103 shown in FIG. 1). For example, in some implementations, the electronic device 103 shown in FIG. 1 can be slid into the HMD. In some implementations, the HMD includes an integrated display for presenting a CGR experience to the user 10. In some implementations, the controller 102 and/or the HMD include the boy character engine 208a, the girl character engine 208b, the robot equipment engine 208c, the drone equipment engine 208d and/or the environmental engine 208e.

Figure 2A:
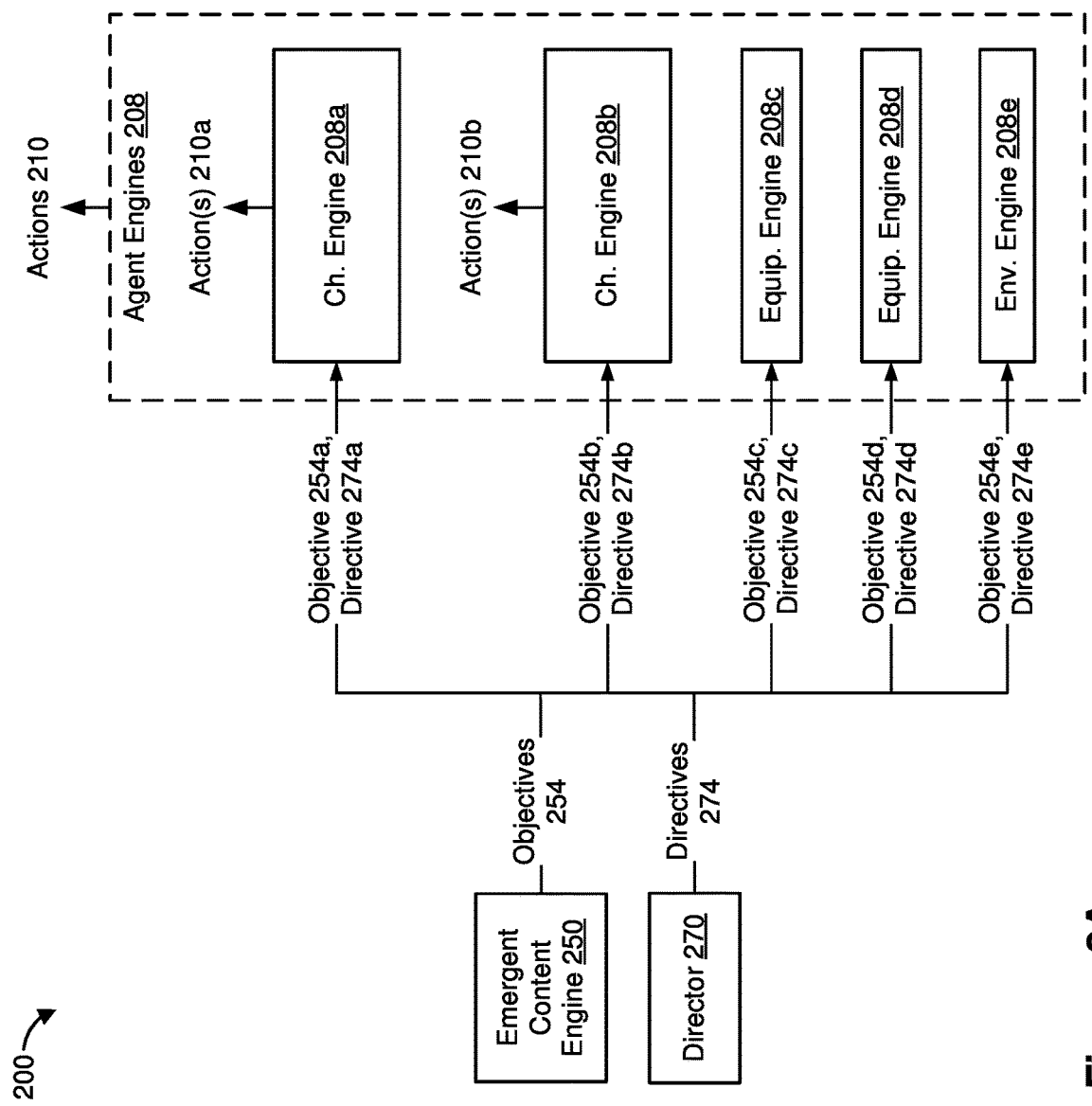
FIGS. 2A-2E are block diagrams of an example system for influencing actions of agents in accordance with some implementations.

FIGS. 2A-2E are block diagrams of an example system 200 in which an agent generates influence for another agent. To that end, the system 200 includes various agent engines 208, an emergent content engine 250, and a director 270. In the example of FIG. 2A, the agent engines 208 include the boy character engine 208a, the girl character engine 208b, the robot equipment engine 208c, the drone equipment engine 208d and the environmental engine 208e. In various implementations, the emergent content engine 250 generates objectives 254 for the agent engines 208. For example, the emergent content engine 250 generates a first objective 254a for the boy character engine 208a, a second objective 254b for the girl character engine 208b, a third objective 254c for the robot equipment engine 208c, a fourth objective 254d for the drone equipment engine 208d, and a fifth objective 254e for the environment engine 208e.

In various implementations, the director 270 generates directives 274 for the agent engines 208. For example, the director 270 generates a first directive 274a for the boy character engine 208a, a second directive 274b for the girl character engine 208b, a third directive 274c for the robot equipment engine 208c, a fourth directive 274d for the drone equipment engine 208d, and a fifth directive 274e for the environment engine 208e. In some implementations, the directives 274 provide guidance on generating actions 210 that satisfy the objectives 254. For example, the first directive 274a provides the boy character engine 208a guidance on generating a first set of actions 210a for the boy action figure representation 108a in order to advance the first objective 254a. Similarly, the second directive 274b provides the girl character engine 208b guidance on generating a second set of actions 210b for the girl action figure representation 108b in order to advance the second objective 254b.

Figure 2B:
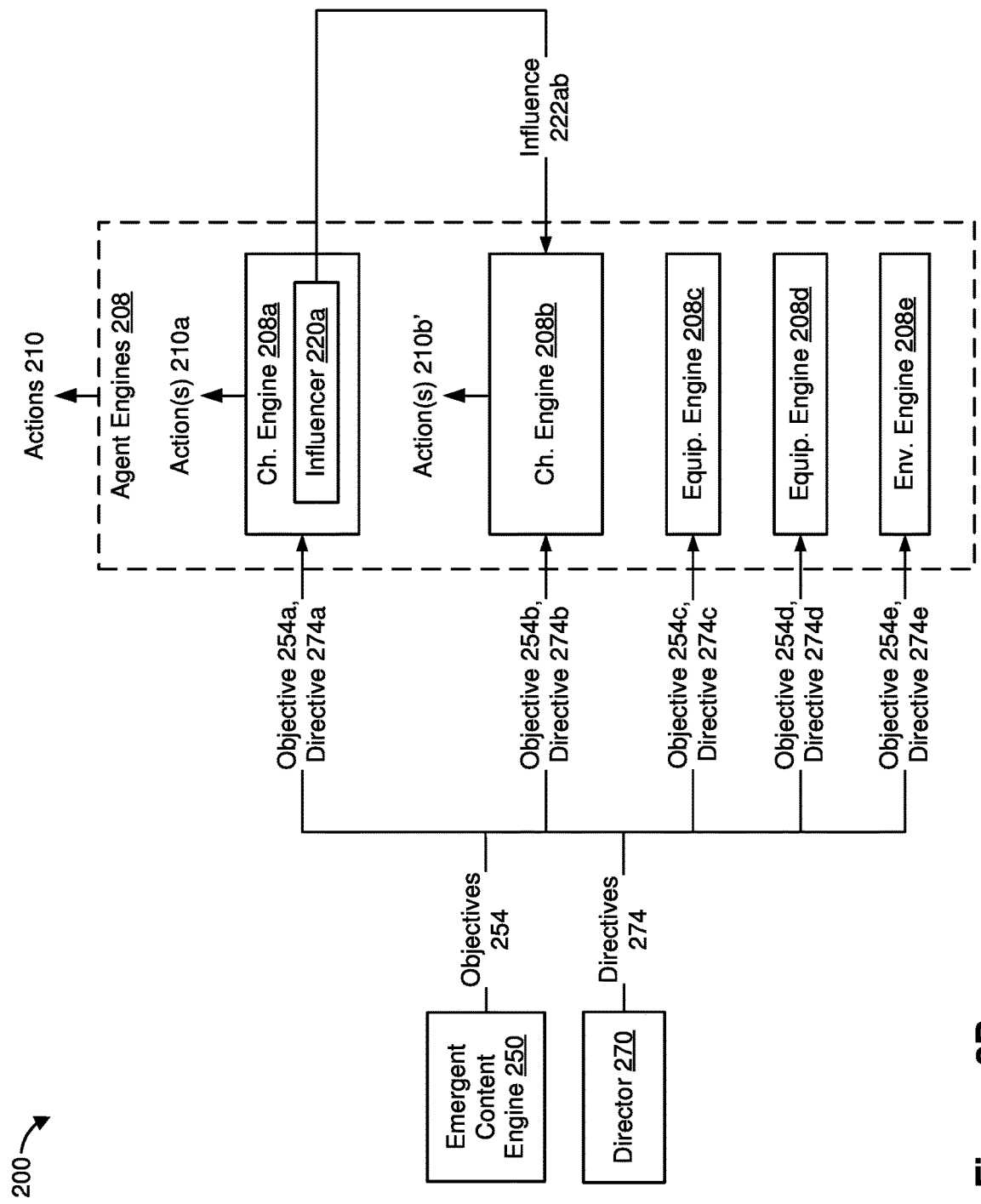

Referring to FIG. 2B, in some implementations, the boy character engine 208a includes an influencer 220a that generates an influence 222ab for the girl character engine 208b. The influence 222ab causes the girl character engine 208b to generate a third set of actions 210b' for the girl action figure representation 108b in order to advance the first objective 254a of the boy agent. In some implementations, the girl character engine 208b provides the third set of actions 210b' to a rendering and display pipeline that displays manipulations of the girl action figure representation 108b as performing the third set of actions 210b'. In various implementations, the third set of actions 210b' are different from the second set of actions 210b (shown in FIG. 2A) because the third set of actions 210b' primarily advance the first objective 254a while the second set of actions 210b primarily advances the second objective 254b. In some implementations, the influence 222ab causes the girl agent 208b to prioritize the first objective 254a over the second objective 254b.

Figure 2C:
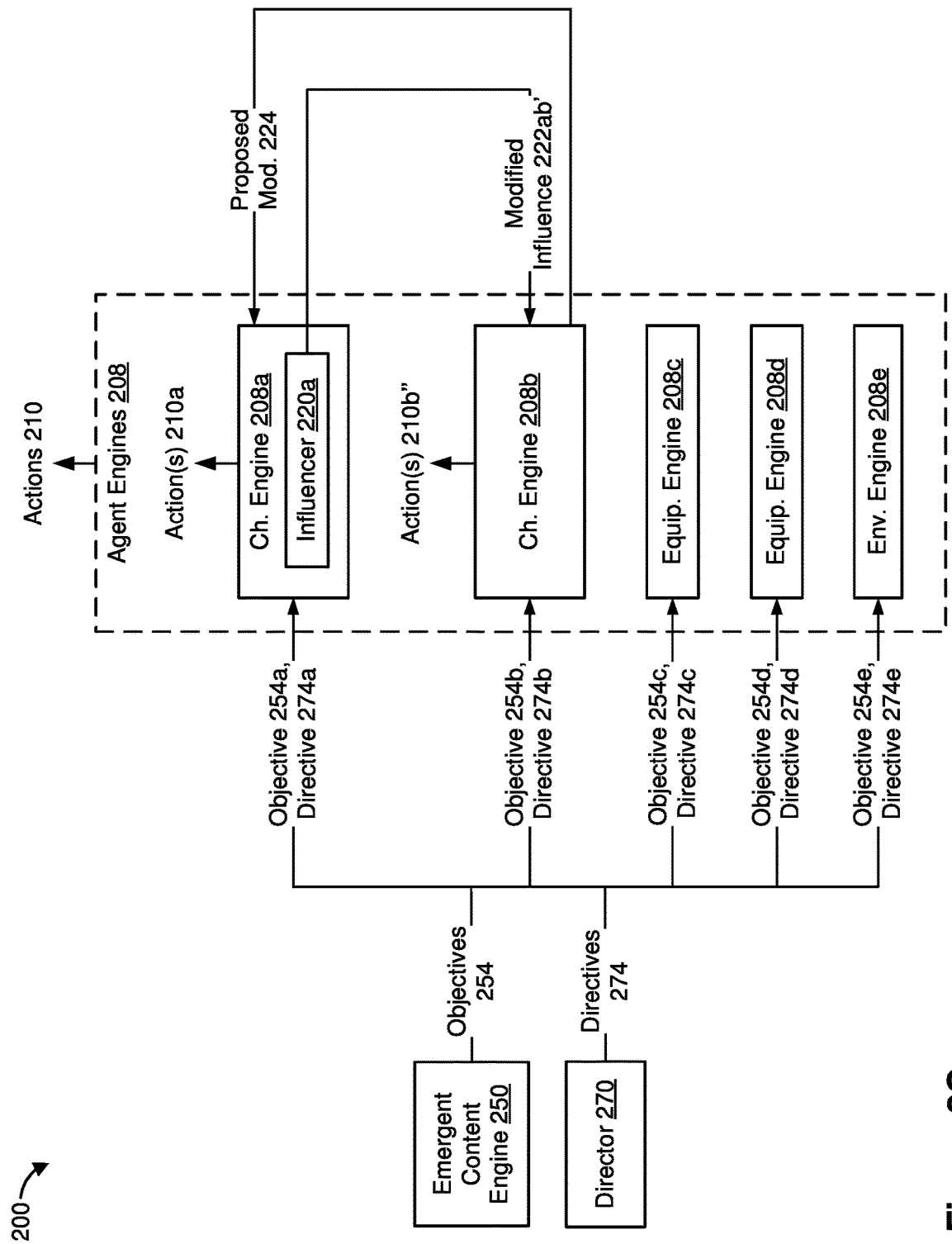

Referring to FIG. 2C, in some implementations, the girl character engine 208b generates a proposed modification 224 to actions indicated by the influence 222ab. The girl character engine 208b provides the proposed modification 224 to the boy character engine 208a. In some implementations, the boy character engine 208a generates a modified influence 222ab' based on the proposed modification 224. In some implementations, the modified influence 222ab' incorporates a modification indicated by the proposed modification 224. The boy character engine 208a (e.g., the influencer 220a) provides the modified influence 222ab' to the girl character engine 208b. The girl character engine 208b generates a fourth set of actions 210b' based on the modified influence 222ab'. In some implementations, being able to generate the proposed modification 224 and obtain the modified influence 222ab' allows the girl character engine 208b to negotiate what actions the girl action figure representation 108b has to perform in order to advance the first objective 254a. More generally, in various implementations, when a first agent engine provides an influence to a second agent engine, the second agent engine can propose a modification to the influence in order to limit an extent of control that the first agent engine exercises over actions generated by the second agent engine. This is different from a typical master-slave arrangement in which a slave device executes all instructions provided by a master device.

Figure 2D:
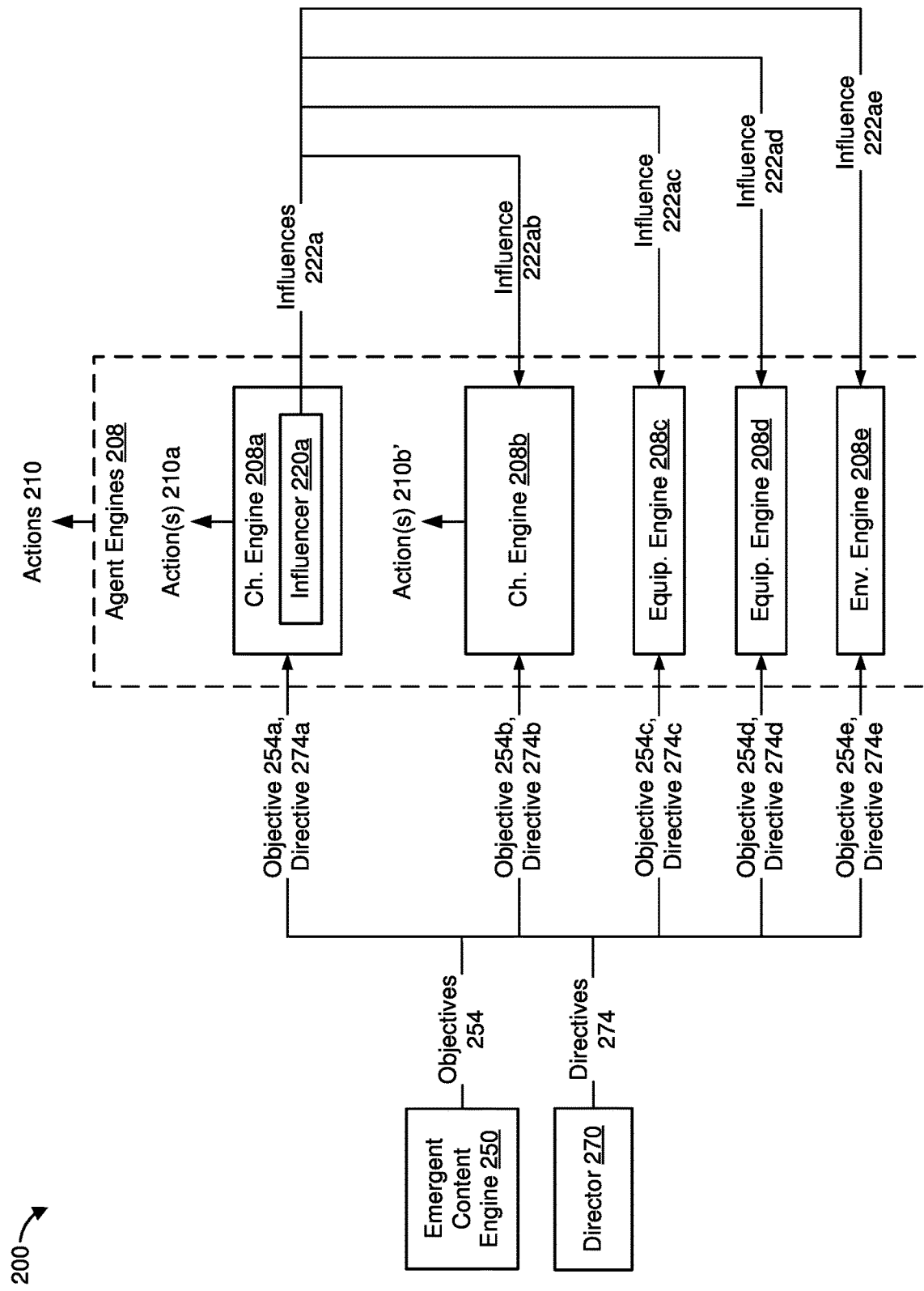

Referring to FIG. 2D, in some implementations, an agent engine provides influences to several (e.g., all) other agent engines. In the example of FIG. 2D, the influencer 220a generates influences 222a for other agent engines. For example, the influencer 220a includes the influence 222ab for the girl character engine 208b, an influence 222ac for the robot equipment engine 208c, an influence 222ad for the drone equipment engine 208d, and an influence 222ae for the environmental engine 208e. As described herein, the influence 222ab triggers the girl character engine to generate the third set of actions 210b' in order to advance the first objective 254a. Similarly, the influence 222ac triggers the robot equipment engine 208c to generate a set of actions for the robot representation 108c in order to advance the first objective 254a. The influence 222ad triggers the drone equipment engine 208d to generate a set of actions for the drone representation 108d in order to advance the first objective 254a. The influence 222ae triggers the environmental engine 208e to generate a set of environmental responses that advance the first objective 254a. In the example of FIG. 2D, as a result of the influences 222a, the actions 210 primarily advance the first objective 254a.

Figure 2E:
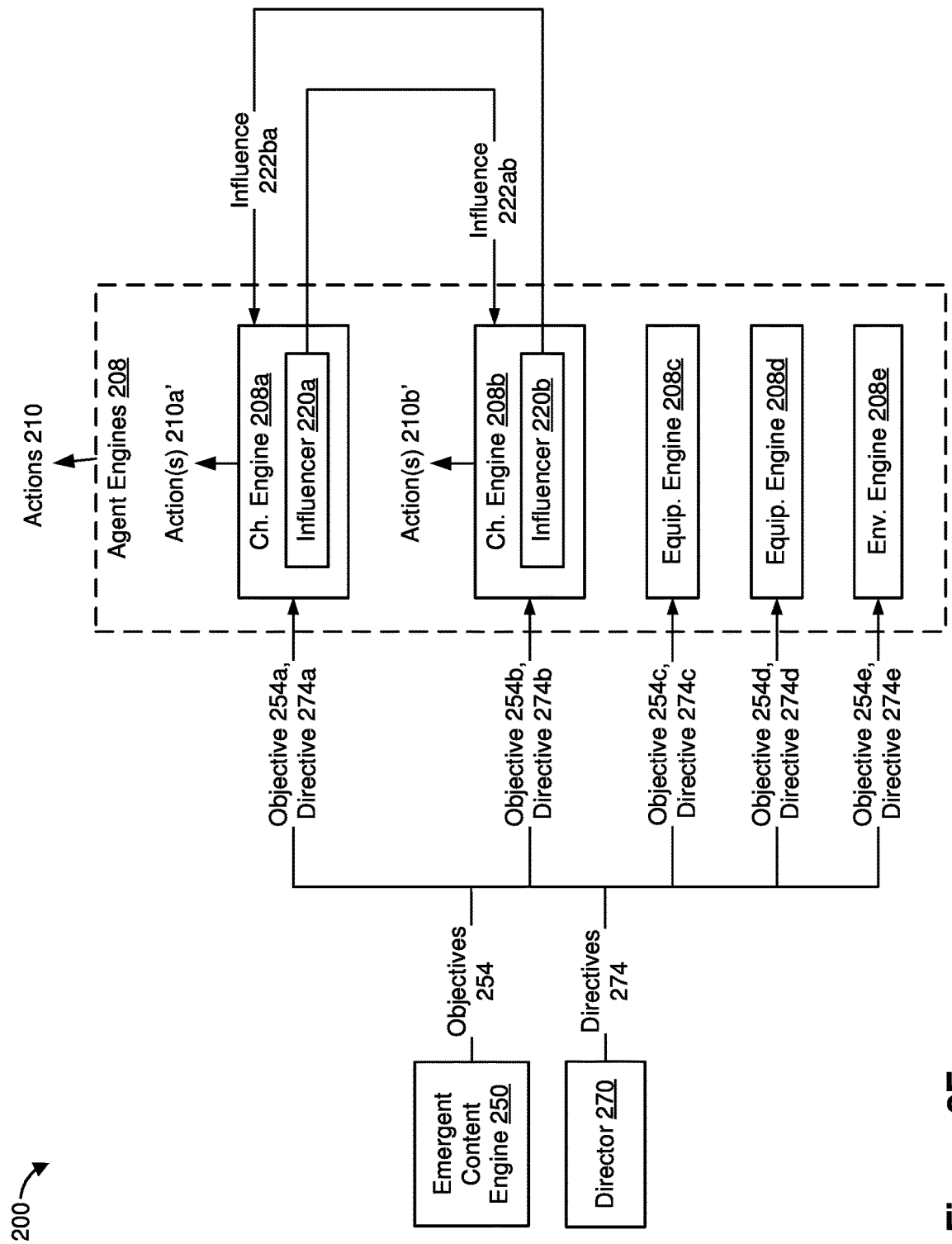

Referring to FIG. 2E, in some implementations, multiple agent engines generate influences. This is different from a typical master-slave arrangement in which there is a single master device. In some implementations, the agent engines 208 generate influences for each other. In the example of FIG. 2E, the girl character engine 208*b* includes an influencer 220*b* that generates an influence 222*ba* for the boy character engine 208*a*. The boy character engine 208*a* generates a fifth set of actions 210*a'* for the boy action figure representation 108*a* in order to advance the second objective 254*b*. In the example of FIG. 2E, the boy character engine 208*a* generates the fifth set of actions 210*a'* in order to primarily advance the second objective 254*b* (e.g., instead of primarily advancing the first objective 254*a*), and the girl character engine 208*b* generates the third set of actions 210*b'* in order to primarily advance the first objective 254*a* (e.g., instead of primarily advancing the second objective 254*b*).

Figure 2F:
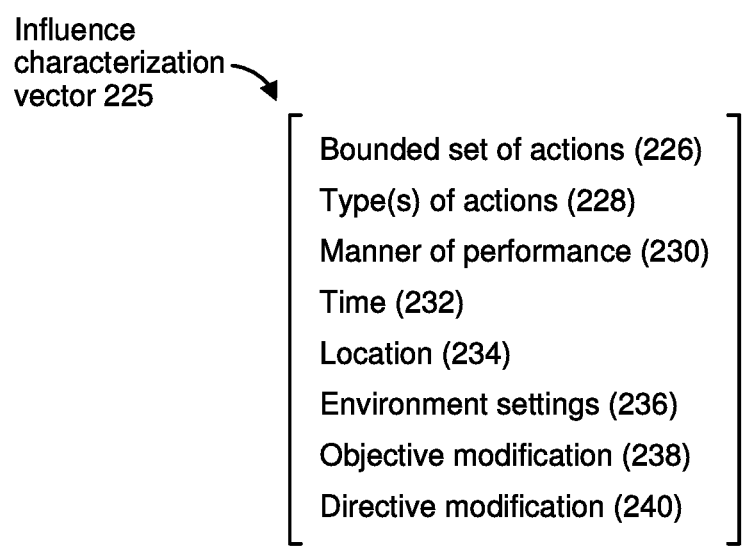
FIG. 2F is a diagram of an example influence characterization vector in accordance with some implementations.

FIG. 2F is a diagram of an example influence characterization vector 225 in accordance with some implementations. In some implementations, the influence characterization vector 225 characterizes an influence (e.g., one of the influences 222*a* shown in FIG. 2D). In some implementations, an influence (e.g., the influence 222*ab* shown in FIG. 2B) includes the influence characterization vector 225. In some implementations, the influence characterization vector 225 includes guidance on generating actions that advance an objective.

In some implementations, the influence characterization vector 225 indicates a bounded set of actions 226. In some implementations, the actions that an agent engine generates are limited to the bounded set of actions 226. In some implementations, the bounded set of actions 226 indicates a set of permissible actions (e.g., a set of whitelisted actions). In such implementations, an agent engine generates the actions by selecting the actions that are in the permissible set of actions. For example, referring to FIG. 2B, in some implementations, the girl character engine 208*b* generates the third set of actions 210*b'* by selecting the third set of actions 210*b'* from the bounded set of actions 226. In some implementations, the bounded set of actions 226 indicates a set of impermissible actions (e.g., a set of blacklisted actions). In such implementations, an agent engine generates the actions by selecting actions that are not in the impermissible set of actions.

In some implementations, the influence characterization vector 225 indicates one or more types of actions 228. In some implementations, the actions that an agent engine generates are limited to the type(s) of actions 228 indicated by the influence characterization vector 225. For example, referring to FIG. 2B, in some implementations, the third set of actions 210*b'* generated by the girl character engine 208*b* are of the type(s) of actions 228 indicated by the influence characterization vector 225.

In some implementations, the influence characterization vector 225 indicates a manner of performance 230 that characterizes how a CGR representation of an agent is to perform its actions. For example, referring to FIG. 2B, the manner of performance 230 characterizes how the girl action figure representation 108*b* is to perform the third set of actions 210*b'*. In some implementations, the manner of performance 230 provides guidance on how to perform the action(s). In some implementations, the manner of performance 230 provides behavioral guidance. For example, in some implementations, the manner of performance 230 instructs the girl action figure representation 108*b* to perform an action angrily (e.g., in an angry manner, for example, with an angry emotion).

In the example of FIG. 2F, the influence characterization vector 225 includes a time 232 for satisfying the objective. In some implementations, the time 232 includes a time period for satisfying the objective. For example, referring to FIG. 2B, in some implementations, the influence 222*ab* includes a time period for the girl character engine 208*b* to generate the third set of actions 210*b'* that advances the first objective 254*a*. In some implementations, the time 232 includes a start time at which the objective is activated and a stop time at which the objective is deactivated.

In some implementations, the influence characterization vector 225 includes a location 234 for satisfying the objective. In some implementations, the location 225 defines a geographical area within the CGR environment for performing actions that advance the objective. For example, referring to FIG. 2B, in some implementations, the influence 222*ab* includes a location at which the girl action figure representation 108*b* is to perform the third set of actions 210*b'* in order to advance the first objective 254*a*.

In some implementations, the influence characterization vector 225 includes environmental settings 236 for the CGR environment 106. In some implementations, the environmental settings 236 trigger actions that advance an agent towards the objective. For example, in some implementations, the environmental settings 236 trigger the girl action figure representation 108*b* to perform actions that advance the first objective 254*a*. In some implementations, an influence includes passive guidance that triggers an agent to generate actions from a subset of possible actions by eliminating the remainder of the possible actions (e.g., by setting environmental settings 236 that make the remainder of the possible actions impossible or infeasible).

In some implementations, the influence characterization vector 225 includes an objective modification 238. In some implementations, the influence characterization vector 225 modifies an existing objective of an agent so that the agent generates actions that advance the objective of another agent. For example, the influence 222*ab* modifies the second objective 254*b* so that the girl character engine 208*b* generates the third set of actions 210*b'* in order to advance the first objective 254*a*. In some implementations, the objective modification 238 includes an objective replacement. For example, in some implementations, the influence 222*ab* replaces the second objective 254*b* with the first objective 254*a* so that the girl character engine 208*b* generates the third set of actions 210*b'* in order to advance the first objective 254*a*. In some implementations, the objective modification 238 includes an objective suppression. For example, the influence 222*ab* suppresses the second objective 254*b* so that the girl character engine 208*b* prioritizes the first objective 254*a* over the second objective 254*b*. In some implementations, the objective modification 238 includes a delaying of an objective. For example, the influence 222*ab* delays action on the second objective 254*b*.

In some implementations, the influence characterization vector 225 includes a directive modification 240. In some implementations, the influence characterization vector 225 modifies an existing directive of an agent so that the agent generates actions in accordance with the directive of another agent. For example, the influence 222*ab* modifies the second directive 274*b* so that the girl character engine 208*b* generates the third set of actions 210*b'* in order to advance the first objective 254*a*. In some implementations, the directive modification 240 includes a directive replacement. For example, in some implementations, the influence 222*ab* replaces the second directive 274*b* with the first directive 274*a* so that the girl character engine 208*b* generates the third set of actions 210*b'* in order to advance the first objective 254*a*. In some implementations, the directive modification 240 includes a directive suppression. For example, the influence 222*ab* suppresses the second directive 274*b* so that the girl character engine 208*b* prioritizes the first objective 254*a* over the second objective 254*b*. In some implementations, the directive modification 240 includes a delaying of a directive. For example, the influence 222*ab* delays action generation based on the second directive 274*b*.

Figure 3A:
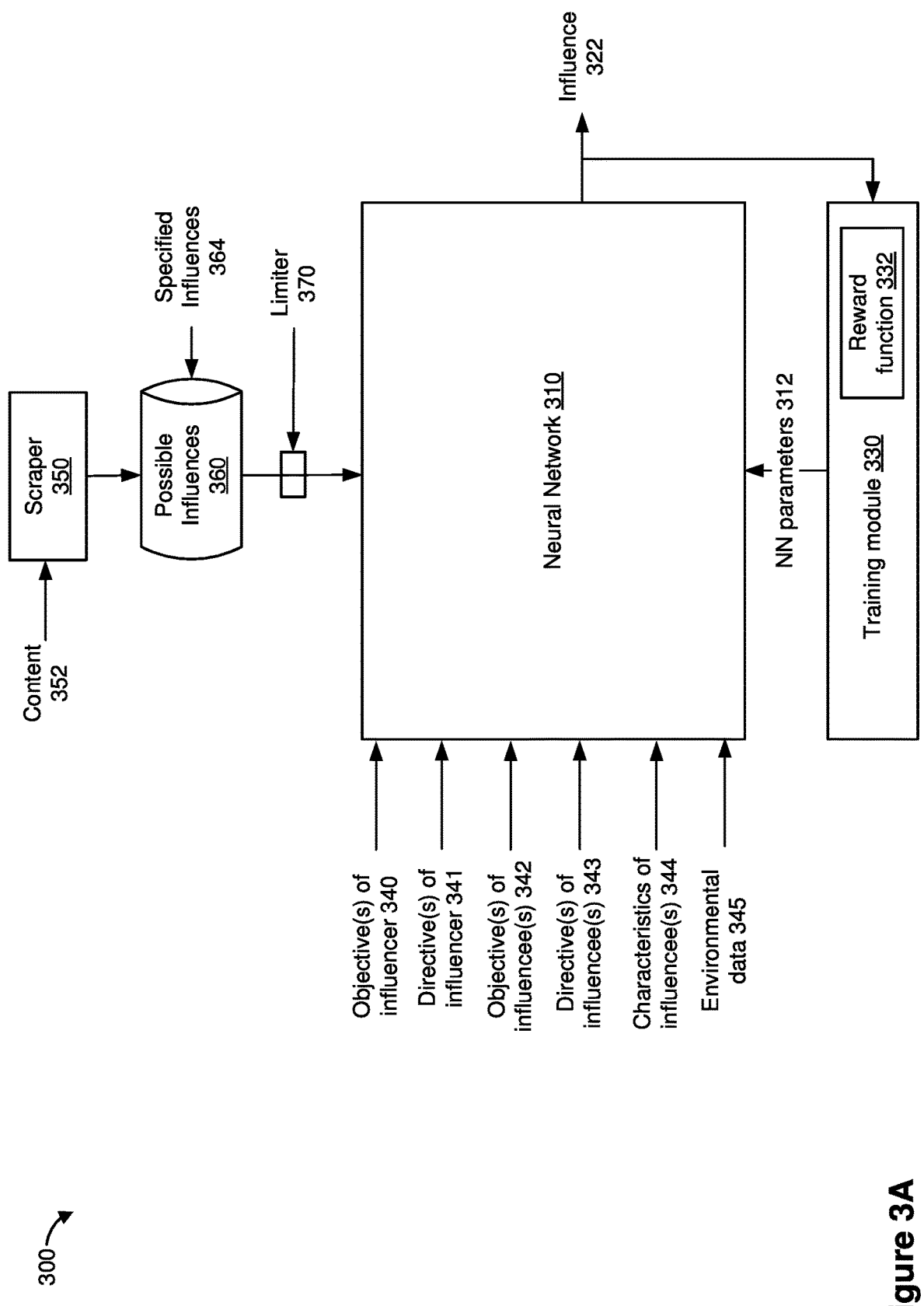
FIG. 3A is a block diagram of an example influencer in accordance with some implementations.

FIG. 3A is a block diagram of an example influencer 300 in accordance with some implementations. In some implementations, the influencer 300 implements the influencer 220*a* shown in FIG. 2B and/or the influencer 220*b* shown in FIG. 2E. In some implementations, the influencer 300 generates one or more influences 322 for various agents. In some implementations, the influences 322 trigger the agent engines (e.g., the girl character engine 208*b*, the robot equipment engine 208*c*, the drone equipment engine 208*d*, and the environmental engine 208*e*) to generate actions in accordance with the influences 322.

In various implementations, the influencer 300 includes a neural network system 310 ("neural network 310", hereinafter for the sake of brevity), a neural network training system 330 ("a training module 330", hereinafter for the sake of brevity) that trains (e.g., configures) the neural network 310, and a scraper 350 that provides possible influences 360 to the neural network 310. In various implementations, the neural network 310 generates the influence(s) 322 for the agent engine(s) based on various inputs including one or more objectives 340 of the influencer 300, one or more directives 341 of the influencer 300, one or more objectives 342 of one or more influencees, one or more directives 343 of the one or more influencees, one or more characteristics values 344 of the one or more influencees, and/or environmental data 345.

In some implementations, the neural network 310 includes a long short-term memory (LSTM) recurrent neural network (RNN). In various implementations, the neural network 310 generates the influences 322 based on a function of the possible influences 360. For example, in some implementations, the neural network 310 generates the influences 322 by selecting a subset of the possible influences 360. In some implementations, the neural network 310 generates the influences 322 such that the influences 322 are within a degree of similarity to at least some of the possible influences 360.

In some implementations, the neural network 310 generates the influence(s) 322 based on one or more objectives 340 of the influencer 300. For example, if the influencer 300 implements the influencer 220*a* shown in FIG. 2B, the neural network 310 generates the influence(s) 322 based on the first objective 254*a* of the boy agent. In some implementations, the neural network 310 generates the influence(s) 322 in order to advance the one or more objectives 340 of the influencer 300 (e.g., so that the influence(s) 322 triggers actions that advance the one or more objectives 340 of the influencer 300).

In some implementations, the neural network 310 generates the influence(s) 322 based on one or more directives 341 of the influencer 300. For example, if the influencer 300 implements the influencer 220*a* shown in FIG. 2B, the neural network 310 generates the influence(s) 322 based on the first directive 274*a* of the boy agent. In some implementations, the neural network 310 generates the influence(s) 322 in order to advance the one or more objectives 340 of the influencer 300 (e.g., so that the influence(s) 322 triggers actions that are in accordance with the one or more directives 341 of the influencer 300).

In some implementations, the neural network 310 generates the influence(s) 322 based on one or more objectives 342 of the influencee(s). For example, if the influencer 300 implements the influencer 220*a* shown in FIG. 2B, the neural network 310 generates the influence(s) 322 based on the second objective 254*b* of the girl agent. In some implementations, the influence(s) 322 modifies (e.g., suppresses, delays and/or replaces) the one or more objectives 342 of the influencee(s) (e.g., so that the influence(s) 322 triggers actions that advance the one or more objectives 340 of the influencer 300).

In some implementations, the neural network 310 generates the influence(s) 322 based on one or more directives 343 of the influencee(s). For example, if the influencer 300 implements the influencer 220*a* shown in FIG. 2B, the neural network 310 generates the influence(s) 322 based on the second directive 274*b* of the girl agent. In some implementations, the influence(s) 322 modifies (e.g., suppresses, delays and/or replaces) the one or more directives 343 of the influencee(s) (e.g., so that the influence(s) 322 triggers actions that advance the one or more objectives 340 of the influencer 300).

In some implementations, the neural network 310 generates the influence(s) 322 based on one or more characteristic values 344 associated with the influencee(s). For example, if the influencer 300 implements the influencer 220*a* shown in FIG. 2B, then the neural network 310 generates the influence(s) 322 based on one or more characteristic values associated with the girl agent. In some implementations, the one or more characteristic values 344 indicate capabilities of the influencee(s). For example, the one or more characteristic values 344 indicate physical, functional and/or behavioral capabilities of the girl action figure representation 108*b* (e.g., the one or more characteristic values 344 indicate whether the girl action figure representation 108*b* can fly). In some implementations, the influences 322 indicate actions that are possible and forgo indicating actions that are not possible (e.g., if the one or more characteristic values 344 indicate that the girl action figure representation 108*b* does not have flying powers, the influence(s) 322 may indicate a running action instead of a flying action).

In some implementations, the neural network 310 generates the influence(s) 322 based on the environmental data 345 indicative of environmental conditions within a CGR environment. In some implementations, the influence(s) 322 forgo indicating actions that are not feasible based on the environmental conditions. For example, if the environmental data 345 indicates that it is raining within the CGR environment, the influence(s) 322 forgoes indicating an action that includes lighting a fire. In some implementations, the influences 322 indicate actions that are possible based on the environmental conditions indicated by the environmental data 345. For example, if the environmental data 345 indicates that it is raining within the CGR environment, the influences 322 indicate an action that includes opening an umbrella to stay dry.

In various implementations, the training module 330 trains the neural network 310. In some implementations, the training module 330 provides neural network (NN) parameters 312 to the neural network 310. In some implementations, the neural network 310 includes a model of neurons, and the neural network parameters 312 represent weights for the neurons. In some implementations, the training module 330 generates (e.g., initializes or initiates) the neural network parameters 312, and refines the neural network parameters 312 based on the influence(s) 322 generated by the neural network 310.

In some implementations, the training module 330 includes a reward function 332 that utilizes reinforcement learning to train the neural network 310. In some implementations, the reward function 332 assigns a positive reward to influences that are desirable, and a negative reward to influences that are undesirable. In some implementations, during a training phase, the training module 330 compares the influences with verification data that includes verified influences. In such implementations, if a particular influence is within a degree of similarity to the verified influences, the training module 330 stops training the neural network 310. However, if the influence is not within the degree of similarity to the verified influence, the training module 330 continues to train the neural network 310. In various implementations, the training module 330 updates the neural network parameters 312 during/after the training.

In various implementations, the scraper 350 scrapes content 352 to identify the possible influences 360. In some implementations, the content 352 includes movies, video games, comics, novels, and fan-created content such as blogs and commentary. In some implementations, the scraper 350 utilizes various methods, systems, and devices associated with content scraping to scrape the content 352. For example, in some implementations, the scraper 350 utilizes one or more of text pattern matching, HTML (Hyper Text Markup Language) parsing, DOM (Document Object Model) parsing, image processing, and audio analysis in order to scrape the content 352 and identify the possible influences 360. In some implementations, the scraper 350 extracts actions from the content 352 and performs semantic analysis on the extracted actions to generate the possible influences 360.

In some implementations, the neural network 310 generates the influence(s) 322 based on specified influences 364. In some implementations, the specified influences 364 are provided by an entity that controls the fictional materials from where the character or equipment originated. For example, in some implementations, the specified influences 364 are provided (e.g., conceived of) by a movie producer, a video game creator, a novelist, etc. In some implementations, the possible influences 360 include the specified influences 364. As such, in some implementations, the neural network 310 generates the influence(s) 332 by selecting a portion of the specified influences 364.

In some implementations, the possible influences 360 for an agent are limited by a limiter 370. In some implementations, the limiter 370 restricts the neural network 310 from selecting a portion of the possible influences 360. In some implementations, the limiter 370 is controlled by the entity that controls (e.g., owns) the fictional materials from where the character or equipment originated. For example, in some implementations, the limiter 370 is controlled (e.g., operated and/or managed) by a movie producer, a video game creator, a novelist, etc. In some implementations, the limiter 370 and the neural network 310 are controlled/operated by different entities. In some implementations, the limiter 370 restricts the neural network 310 from generating influences that breach a criterion defined by the entity that controls the fictional materials. For example, in a parental control mode, the limiter 370 prevents the neural network 310 from generating influences that trigger violent actions.

Figure 3B:
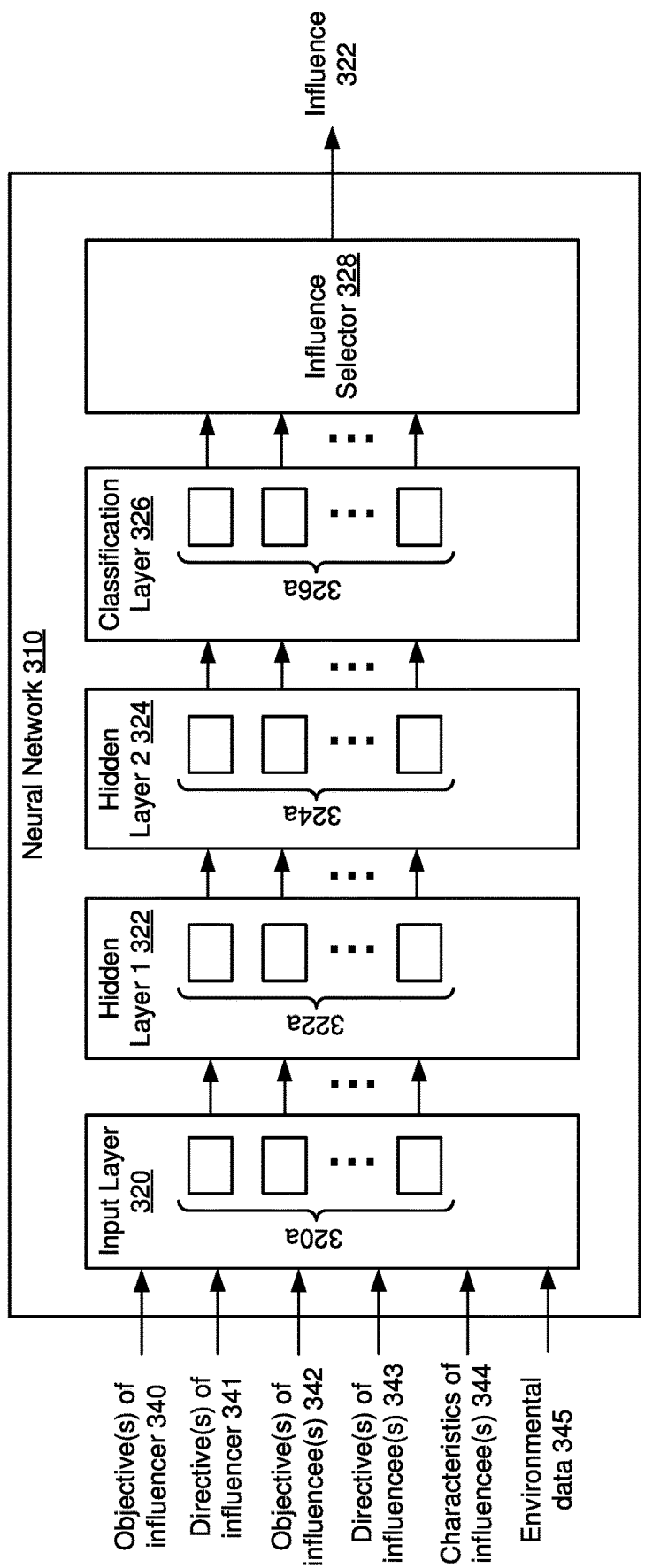
FIG. 3B is a block diagram of an example neural network in accordance with some implementations.

FIG. 3B is a block diagram of the neural network 310 in accordance with some implementations. In the example of FIG. 3B, the neural network 310 includes an input layer 320, a first hidden layer 322, a second hidden layer 324, a classification layer 326, and an influence selector 328. While the neural network 310 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

In various implementations, the input layer 320 is coupled (e.g., configured) to receive various inputs. In the example of FIG. 3B, the input layer 320 receives as inputs the one or more objectives 340 of the influencer 300, the one or more directives 341 of the influencer 300, the one or more objectives 342 of one or more influencees, the one or more directives 343 of one or more influencees, the one or more characteristic values 344 of one or more influencees and/or the environmental data 345. In some implementations, the neural network 310 includes a feature extraction module (not shown) that generates a feature stream (e.g., a feature vector) based on the one or more objectives 340 of the influencer 300, the one or more directives 341 of the influencer 300, the one or more objectives 342 of one or more influencees, the one or more directives 343 of one or more influencees, the one or more characteristic values 344 of one or more influencees and/or the environmental data 345. In such implementations, the feature extraction module provides the feature stream to the input layer 320. As such, in some implementations, the input layer 320 receives a feature stream that is a function of the one or more objectives 340 of the influencer 300, the one or more directives 341 of the influencer 300, the one or more objectives 342 of one or more influencees, the one or more directives 343 of one or more influencees, the one or more characteristic values 344 of one or more influencees and/or the environmental data 345. In various implementations, the input layer 320 includes a number of LSTM logic units 320a, which are also referred to as model(s) of neurons by those of ordinary skill in the art. In some such implementations, an input matrix from the features to the LSTM logic units 320a include rectangular matrices. The size of this matrix is a function of the number of features included in the feature stream.

In some implementations, the first hidden layer 322 includes a number of LSTM logic units 322a. In some implementations, the number of LSTM logic units 322a ranges between approximately 10-500. Those of ordinary skill in the art will appreciate that, in such implementations, the number of LSTM logic units per layer is orders of magnitude smaller than previously known approaches (being of the order of $O(10^1)$-$O(10^2)$), which allows such implementations to be embedded in highly resource-constrained devices. As illustrated in the example of FIG. 3B, the first hidden layer 322 receives its inputs from the input layer 320.

In some implementations, the second hidden layer 324 includes a number of LSTM logic units 324a. In some implementations, the number of LSTM logic units 324a is the same as or similar to the number of LSTM logic units 320a in the input layer 320 or the number of LSTM logic units 322a in the first hidden layer 322. As illustrated in the example of FIG. 3B, the second hidden layer 324 receives its inputs from the first hidden layer 322. Additionally or alternatively, in some implementations, the second hidden layer 324 receives its inputs from the input layer 320.

In some implementations, the classification layer 326 includes a number of LSTM logic units 326a. In some implementations, the number of LSTM logic units 326a is the same as or similar to the number of LSTM logic units 320a in the input layer 320, the number of LSTM logic units 322a in the first hidden layer 322, or the number of LSTM logic units 324a in the second hidden layer 324. In some implementations, the classification layer 326 includes an implementation of a multinomial logistic function (e.g., a soft-max function) that produces a number of candidate influences. In some implementations, the number of candidate influences is approximately equal to the number of possible influences 360. In some implementations, the candidate influences are associated with corresponding confidence scores which include a probability or a confidence measure that the corresponding influence advances the corresponding objective 254. In some implementations, the outputs do not include influences that have been excluded by operation of the limiter 370.

In some implementations, the influence selector 328 generates the influence(s) 322 by selecting the top N candidate influences provided by the classification layer 326. For example, in some implementations, the influence selector 328 selects the candidate influences with the highest confidence score. In some implementations, the top N candidate influences are most likely to satisfy the objectives 254. In some implementations, the influence selector 328 provides the influence(s) 322 to one or more agent engines (e.g., the girl character engine 208b shown in FIG. 2B).

Figure 4A:
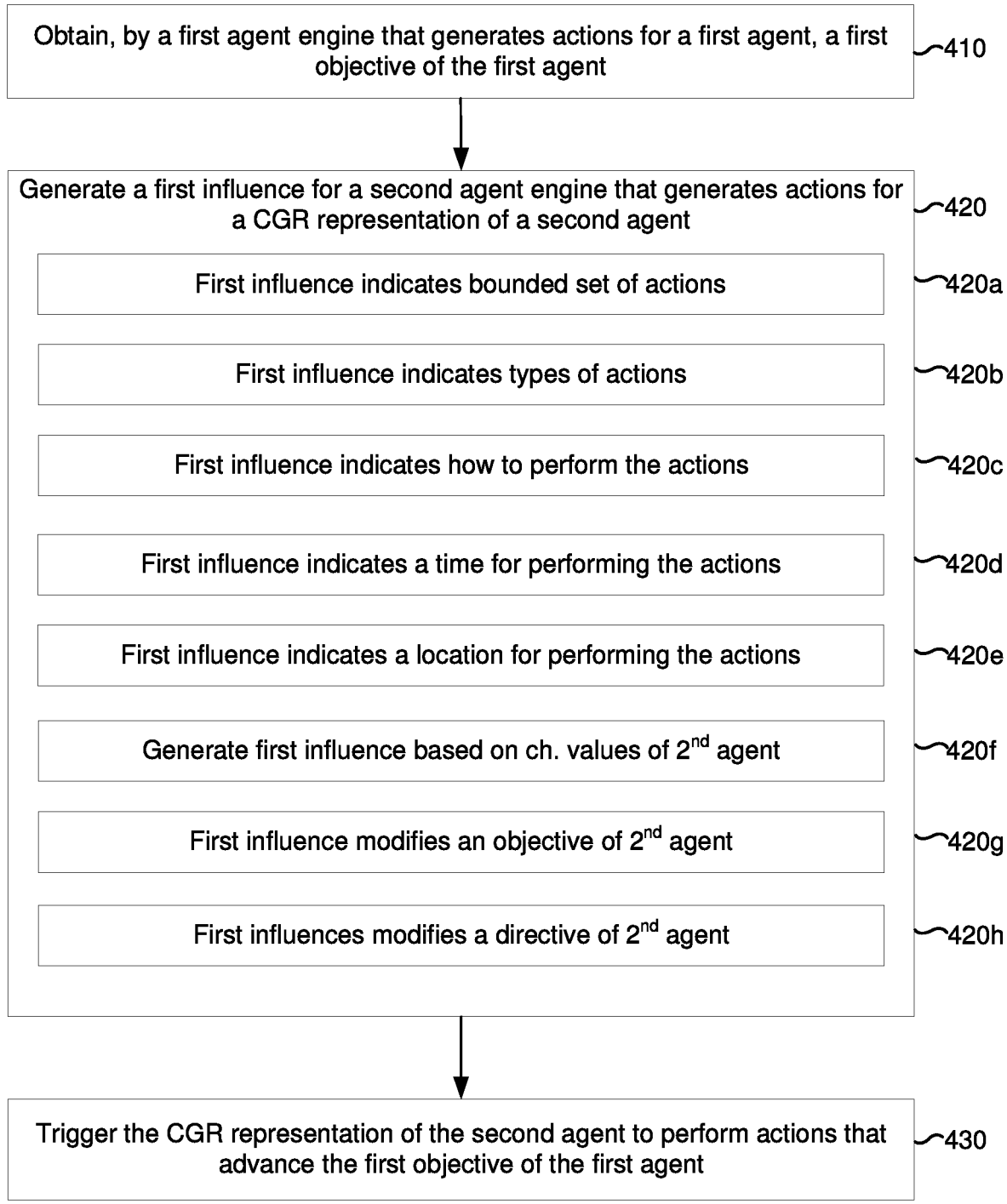

FIG. 4A is a flowchart representation of a method 400 of generating influences for agents. In various implementations, the method 400 is performed by a device with a non-transitory memory and one or more processors coupled with the non-transitory memory (e.g., the controller 102 and/or the electronic device 103 shown in FIG. 1). In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 410, in various implementations, the method 400 includes obtaining, by a first agent engine that generates actions for a first agent, a first objective of the first agent. For example, as shown in FIG. 2B, the boy character engine 208a obtains the first objective 254a. In some implementations, the method 400 includes receiving the first objective from an emergent content engine that generates objectives for various agents. For example, as shown in FIG. 2B, the boy character engine 208a receives the first objective 254a from the emergent content engine 250.

As represented by block 420, in various implementations, the method 400 includes generating, by the first agent engine, a first influence for a second agent engine that generates actions for a CGR representation of a second agent. For example, as shown in FIG. 2B, the boy character engine 208a (e.g., influencer 220a) generates the influence 222ab for the girl character engine 208b. In some implementations, the first influence is based on the first objective of the first agent. For example, the influence 222ab shown in FIG. 2B is based on the first objective 254a.

As represented by block 430, in various implementations, the method 400 includes triggering the CGR representation of the second agent to perform a set of one or more actions that advances the first objective of the first agent. In some implementations, the second agent engine generates the set of one or more actions based on the first influence generated by the first agent engine. For example, as shown in FIG. 2B, the girl character engine 208b generates the third set of actions 210b' based on the influence 222ab. Moreover, as described in relation to FIG. 2B, the third set of actions 210b' advances the first objective 254a of the boy agent.

Allowing the first agent engine to influence the actions of the second agent engine provides the first agent more control over content generation. Providing the first agent more control over content generation tends to lead to more stimulating content thereby improving a user experience provided by the device.

In some implementations, triggering the CGR representation of the second agent to perform actions that advance the first objective of the first agent reduces an amount of time needed to satisfy the first objective. In some implementations, a user of the device turns off a display of the device after the first objective is satisfied. In such implementations, reducing the amount of time needed to satisfy the first objective tends to reduce an amount of time that the display of the device is kept on thereby reducing a power consumption of the device and improving an operability of the device.

As represented by block 420a, in some implementations, the first influence indicates a bounded set of actions for the second agent, and the second agent engine selects the set of one or more actions from the bounded set of actions. For example, as shown in FIG. 2F, in some implementations, the influence characterization vector 225 indicates a bounded set of actions 226. In some implementations, limiting the actions of the second agent to a bounded set of actions that advances the first objective of the first agent provides the first agent more control over content generation.

As represented by block 420b, in some implementations, the first influence indicates types of actions for the CGR representation of the second agent to perform, and the set of one or more actions performed by the CGR representation of the second agent corresponds to the types of actions indicated by the first influence. For example, as shown in FIG. 2F, in some implementations, the influence characterization vector 225 indicates type(s) of actions 228. In some implementations, the third set of actions 210b' shown in FIG. 2B are of the type(s) of actions 228 indicated by the influence characterization vector 225.

As represented by block 420c, in some implementations, the first influence indicates how to perform the set of one or more actions, and the CGR representation of the second agent performs the set of one or more actions in a manner indicated by the first influence. For example, as shown in FIG. 2F, in some implementations, the influence characterization vector 225 indicates a manner of performance 230. In some implementations, the third set of actions 210b' shown in FIG. 2B are performed by the girl action figure representation 108b in the manner of performance 230 indicated by the influence characterization vector 225.

As represented by block 420d, in some implementations, the first influence indicates a time for the CGR representation of the second agent to act in order to advance the first objective of the first agent, and the CGR representation of the second agent performs the set of one or more actions at the time indicated by the first influence. For example, as shown in FIG. 2F, in some implementations, the influence characterization vector 225 indicates the time 232. In some implementations, the girl action figure representation 108b (shown in FIG. 1) performs the third set of actions 210b' (shown in FIG. 2B) at the time 232 indicated by the influence characterization vector 225.

As represented by block 420e, in some implementations, the first influence indicates a location within a CGR environment for the CGR representation of the second agent to act in order to advance the first objective of the first agent, and the CGR representation of the second agent performs the set of one or more actions at the location indicated by the first influence. For example, as shown in FIG. 2F, in some implementations, the influence characterization vector 225 indicates the location 234. In some implementations, the girl action figure representation 108*b* (shown in FIG. 1) performs the third set of actions 210*b*' (shown in FIG. 2B) at the location 234 indicated by the influence characterization vector 225.

As represented by block 420*f,* in some implementations, the method 400 includes generating the first influence based on characteristic values associated with the second agent. For example, as shown in FIG. 3A, in some implementations, the influencer 300 generates the influence(s) 322 based on the one or more characteristic values 344 of one or more influencee(s). In the example of FIG. 2B, the boy character engine 208*a* (e.g., the influencer 220*a*) generates the influence 222*ab* based on one or more characteristic values associated with the girl agent (e.g., based on one or more capabilities of the girl action figure representation 108*b*). In some implementations, the characteristic values indicate physical, functional or behavioral characteristics of the second agent. In some implementations, the characteristic values indicate capabilities of the second agent.

As represented by block 420*g,* in some implementations, the second agent is associated with a second objective, and the first influence modifies the second objective in order to advance the first objective of the first agent. For example, as shown in FIG. 2F, in some implementations, the influence characterization vector 225 indicates the objective modification 238. In some implementations, the influence 222*ab* (shown in FIG. 2B) modifies the second objective 254*b* of the girl agent (e.g., so that the girl character engine 208*b* prioritizes the first objective 254*a* of the boy agent). In some implementations, the first influence causes the first objective to trump the second objective. In some implementations, the first influence cancels the second objective. In some implementations, the first influence includes the first objective, and the first influence causes the second objective to be replaced with the first objective.

As represented by block 420*h,* in some implementations, the second agent is associated with a directive, and the first influence modifies the directive in order to advance the first objective of the first agent. For example, as shown in FIG. 2F, in some implementations, the influence characterization vector 225 indicates a directive modification 240. In some implementations, the influence 222*ab* (shown in FIG. 2B) modifies the second directive 274*b* of the girl agent (e.g., so that the girl character engine 208*b* prioritizes the first objective 254*a* of the boy agent over the second objective 254*b* of the girl agent). In some implementations, the first influence delays the directive of the second agent so that the second agent performs actions that advance the first objective before performing actions that are in accordance with the directive of the second agent. In some implementations, the first influence cancels the directive of the second agent. In some implementations, the first influence includes a new directive, and the new directive replaces the directive of the second agent.

Referring to FIG. 4B, as represented by block 430*a,* in some implementations, the second agent is an environmental agent that controls environmental settings of a CGR environment, and the first influence causes the environmental agent to manipulate the environmental settings in order to advance the first objective of the first agent. For example, as shown in FIG. 2D, the boy character engine 208*a* (e.g., the influencer 220*a*) generates the influence 222*ae* for the environmental engine 208*e,* and the environmental engine 208*e* generates environmental responses based on the influence 222*ae* in order to advance the first objective 254*a.*

As represented by block 430*b,* in some implementations, the second agent is a character agent that models a character and the CGR representation of the second agent represents the character, and the first influence triggers the CGR representation to perform the set of one or more actions in order to advance the first objective of the first agent. For example, as shown in FIG. 2B, the boy character engine 208*a* (e.g., the influencer 220*a*) generates the influence 222*ab* for the girl character engine 208*b,* and the girl character engine 208*b* generates the third set of actions 210*b*' based on the influence 222*ab* in order to advance the first objective 254*a.*

As represented by block 430*c,* in some implementations, the second agent is an equipment agent that models an equipment and the CGR representation of the second agent represents the equipment, and the first influence triggers the CGR representation to perform the set of one or more actions in order to advance the first objective of the first agent. For example, as shown in FIG. 2D, the boy character engine 208*a* (e.g., the influencer 220*a*) generates the influence 222*ac* for the robot equipment engine 208*c,* and the robot equipment engine 208*c* generates a set of actions based on the influence 222*ac* in order to advance the first objective 254*a.*

As represented by block 430*d,* in some implementations, the method 400 includes displaying manipulations of the CGR representation of the second agent in accordance with the first influence. In some implementations, the CGR representation of the second agent is shown as performing the set of one or more actions that advances the first objective of the first agent. For example, in some implementations, the girl action figure representation 108*b* (shown in FIG. 1) is shown as performing the third set of actions 210*b*' (shown in FIG. 2B).

As represented by block 440, in some implementations, the method 400 includes obtaining, by the first agent engine, a proposed modification to the first influence. In some implementations, the proposed modification is generated by the second agent engine. For example, as shown in FIG. 2C, the girl character engine 208*b* provides the proposed modification 224 to the boy character engine 208*a.* In some implementations, the method 400 includes modifying the first influence based on the proposed modification in order to generate a second influence. In some implementations, the method 400 includes providing the second influence to the second agent engine. For example, as shown in FIG. 2C, the boy character engine 208*a* (e.g., the influencer 220*a*) provides the modified influence 222*ab*' to the girl character engine 208*b.* In some implementations, being able to propose a modification to an influence allows the second agent to still pursue the second objective (e.g., by generating actions that advance the second objective in addition to the first objective). In some implementations, being able to propose a modification to an influence allows the second agent to avoid performing actions that are detrimental to the second objective.

As represented by block 450, in some implementations, the method 400 includes obtaining, by the second agent engine, a second objective for the second agent. In some implementations, the method includes generating, by the second agent engine, a second influence for the first agent engine that generates actions for a CGR representation of the first agent. For example, as shown in FIG. 2E, the girl character engine 208*b* generates the influence 222*ba* for the boy character engine 208*a.* In some implementations, the second influence is based on the second objective of the second agent. In some implementations, the method 400 includes triggering the CGR representation of the first agent to perform a set of one or more actions that advances the second objective of the second agent. In some implementations, the first agent engine generates the set of one or more actions based on the second influence generated by the second agent engine. For example, as shown in FIG. 2E, the boy character engine 208a generates the fifth set of actions 210a' based on the influence 222ba in order to advance the second objective 254b. Multiple agents being able to influence each other allows multiple agents to influence the generation of content thereby providing more stimulating content.

Figure 5:
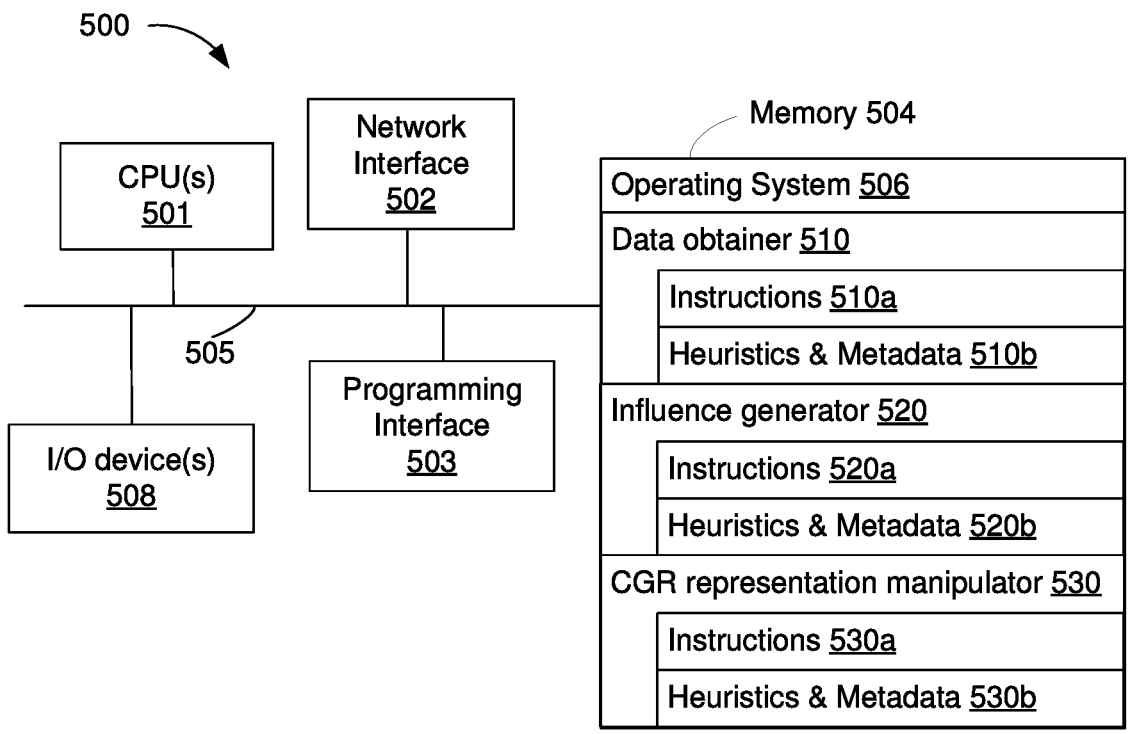
FIG. 5 is a block diagram of a device enabled with various components of an influencer in accordance with some implementations.

FIG. 5 is a block diagram of a device 500 enabled with one or more components of an influencer (e.g., the influencer 220a shown in FIGS. 2B-2E, the influencer 220b shown in FIG. 2E and/or the influencer 300 shown in FIG. 3A) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 501, a network interface 502, a programming interface 503, a memory 504, one or more input/output (I/O) devices 508, and one or more communication buses 505 for interconnecting these and various other components.

In some implementations, the network interface 502 is provided to, among other uses, establish and maintain a metadata tunnel between a cloud hosted network management system and at least one private network including one or more compliant devices. In some implementations, the one or more communication buses 505 include circuitry that interconnects and controls communications between system components. The memory 504 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 504 optionally includes one or more storage devices remotely located from the one or more CPUs 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, a data obtainer 510, an influence generator 520, and a CGR representation manipulator 530. In various implementations, the device 500 performs the method 400 shown in FIGS. 4A-4B.

In some implementations, the data obtainer 510 obtains an objective and/or a directive for an agent instantiated in a CGR environment. For example, the data obtainer 510 obtains the first objective 254a and/or the first directive 274a shown in FIGS. 2A-2E. In some implementations, the data obtainer 510 performs the operation(s) represented by block 410 in FIG. 4A. To that end, the data obtainer 510 includes instructions 510a, and heuristics and metadata 510b.

In some implementations, the influence generator 520 generates one or more influences for other agents. For example, the influence generator 520 generates the influences 222a shown in FIG. 2D (e.g., the influence 222ab shown in FIGS. 2B). In some implementations, the influence generator 520 performs the operations(s) represented by blocks 420, 440, and 450 shown in FIGS. 4A and 4B. To that end, the influence generator 520 includes instructions 520a, and heuristics and metadata 520b.

In some implementations, the CGR representation manipulator 530 displays manipulations of a CGR representation of a second agent in accordance with the influence. For example, the CGR representation manipulator 530 displays manipulations of the girl action figure representation 108b (shown in FIG. 1) based on the influence 222ab (shown in FIG. 2B). In some implementations, the CGR representation manipulator 530 performs the operations represented by block 430 in FIG. 4A, and blocks 430a-430d in FIG. 4B. To that end, the CGR representation manipulator 530 includes instructions 530a, and heuristics and metadata 530b.

In some implementations, the one or more I/O devices 508 include a display (e.g., an opaque display or an optical see-through display). In some implementations, the one or more I/O devices 508 include a sensor (e.g., an environmental sensor, for example, an image sensor, a depth sensor, an audio sensor, etc.).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a non-transitory memory and one or more processors coupled with the non-transitory memory:
        obtaining, by a first agent engine that generates actions for a first agent modeling behavior of a first entity, a first objective of the first agent;
        generating, by the first agent engine, a first influence for a second agent engine that generates actions for a computer-generated reality (CGR) representation of a second agent modeling behavior of a second entity, wherein the first influence is based on the first objective of the first agent and the first influence provides guidance to the second agent engine on generating the actions for the CGR representation of the second agent; and
        triggering the CGR representation of the second agent to perform a set of one or more actions that advances the first objective of the first agent, wherein the second agent engine generates the set of one or more actions based on the first influence generated by the first agent engine.

2. The method of claim 1, wherein the first influence indicates a bounded set of actions for the second agent, and the second agent engine selects the set of one or more actions from the bounded set of actions.

3. The method of claim 1, wherein the first influence indicates types of actions for the CGR representation of the second agent to perform, and the set of one or more actions performed by the CGR representation of the second agent corresponds to the types of actions indicated by the first influence.

4. The method of claim 1, wherein the first influence indicates how to perform the set of one or more actions, and the CGR representation of the second agent performs the set of one or more actions in a manner indicated by the first influence.

5. The method of claim 1, wherein the first influence indicates a start time for the CGR representation of the second agent to act in order to advance the first objective of the first agent, and the CGR representation of the second agent performs the set of one or more actions at the start time indicated by the first influence.

6. The method of claim 1, wherein the first influence indicates a location within a CGR environment for the CGR representation of the second agent to act in order to advance the first objective of the first agent, and the CGR representation of the second agent performs the set of one or more actions at the location indicated by the first influence.

7. The method of claim 1, wherein the second agent is an environmental agent that controls environmental settings of a CGR environment, and the first influence causes the environmental agent to manipulate the environmental settings in order to advance the first objective of the first agent.

8. The method of claim 1, wherein the second agent is a character agent that models the behavior of a character and the CGR representation of the second agent represents the character, and the first influence triggers the CGR representation to perform the set of one or more actions in order to advance the first objective of the first agent.

9. The method of claim 1, wherein the second agent is an equipment agent that models the behavior of an equipment and the CGR representation of the second agent represents the equipment, and the first influence triggers the CGR representation to perform the set of one or more actions in order to advance the first objective of the first agent.

10. The method of claim 1, wherein generating the first influence comprises:
    generating the first influence based on characteristic values associated with the second agent.

11. The method of claim 1, wherein the second agent is associated with a second objective, and the first influence modifies the second objective in order to advance the first objective of the first agent.

12. The method of claim 1, wherein the second agent is associated with a directive, and the first influence modifies the directive in order to advance the first objective of the first agent.

13. The method of claim 1, further comprising:
    displaying manipulations of the CGR representation of the second agent in accordance with the first influence, wherein the CGR representation of the second agent is shown as performing the set of one or more actions that advances the first objective of the first agent.

14. The method of claim 1, further comprising:
    obtaining, by the first agent engine, a proposed modification to the first influence, wherein the proposed modification is generated by the second agent engine;
    modifying the first influence based on the proposed modification in order to generate a second influence; and
    providing the second influence to the second agent engine.

15. The method of claim 1, further comprising:
    obtaining, by the second agent engine, a second objective for the second agent;
    generating, by the second agent engine, a second influence for the first agent engine that generates actions for a CGR representation of the first agent, wherein the second influence is based on the second objective of the second agent and the second influence provides guidance to the first agent engine on generating the actions for the CGR representation of the first agent; and
    triggering the CGR representation of the first agent to perform a set of one or more actions that advances the second objective of the second agent, wherein the first agent engine generates the set of one or more actions based on the second influence generated by the second agent engine.

16. A device comprising:
    one or more processors;
    a non-transitory memory;
    one or more displays; and
    one or more programs stored in the non-transitory memory, which, when executed by the one or more processors, cause the device to:
        obtain, by a first agent engine that generates actions for a first agent modeling behavior of a first entity, a first objective of the first agent;
        generate, by the first agent engine, a first influence for a second agent engine that generates actions for a computer-generated reality (CGR) representation of a second agent modeling behavior of a second entity, wherein the first influence is based on the first objective of the first agent and the first influence provides guidance to the second agent engine on generating the actions for the CGR representation of the second agent; and trigger the CGR representation of the second agent to perform a set of one or more actions that advances the first objective of the first agent, wherein the second agent engine generates the set of one or more actions based on the first influence generated by the first agent engine.

17. The device of claim 16, wherein the first influence indicates a bounded set of actions for the second agent, and the second agent engine selects the set of one or more actions from the bounded set of actions.

18. The device of claim 16, wherein the first influence indicates types of actions for the CGR representation of the second agent to perform, and the set of one or more actions performed by the CGR representation of the second agent corresponds to the types of actions indicated by the first influence.

19. The device of claim 16, wherein the first influence indicates how to perform the set of one or more actions, and the CGR representation of the second agent performs the set of one or more actions in a manner indicated by the first influence.

20. A non-transitory memory storing one or more programs, which, when executed by one or more processors of a device with a display, cause the device to:

obtain, by a first agent engine that generates actions for a first agent modeling behavior of a first entity, a first objective of the first agent;

generate, by the first agent engine, a first influence for a second agent engine that generates actions for a computer-generated reality (CGR) representation of a second agent modeling behavior of a second entity, wherein the first influence is based on the first objective of the first agent and the first influence provides guidance to the second agent engine on generating the actions for the CGR representation of the second agent; and trigger the CGR representation of the second agent to perform a set of one or more actions that advances the first objective of the first agent, wherein the second agent engine generates the set of one or more actions based on the first influence generated by the first agent engine.

21. The device of claim 16, wherein the second agent is an equipment agent that models the behavior of an equipment and the CGR representation of the second agent represents the equipment, and the first influence triggers the CGR representation to perform the set of one or more actions in order to advance the first objective of the first agent.

22. The non-transitory memory of claim 20, wherein the first influence indicates how to perform the set of one or more actions, and the CGR representation of the second agent performs the set of one or more actions in a manner indicated by the first influence.

23. The non-transitory memory of claim 20, wherein the first influence indicates a start time for the CGR representation of the second agent to act in order to advance the first objective of the first agent, and the CGR representation of the second agent performs the set of one or more actions at the start time indicated by the first influence.

24. The non-transitory memory of claim 20, wherein the first influence indicates a location within a CGR environment for the CGR representation of the second agent to act in order to advance the first objective of the first agent, and the CGR representation of the second agent performs the set of one or more actions at the location indicated by the first influence.

25. The non-transitory memory of claim 20, wherein the second agent is a character agent that models the behavior of a character and the CGR representation of the second agent represents the character, and the first influence triggers the CGR representation to perform the set of one or more actions in order to advance the first objective of the first agent.

* * * * *